United States Patent
Li et al.

(10) Patent No.: US 10,031,598 B1
(45) Date of Patent: Jul. 24, 2018

(54) ADJUSTABLE EFFECTIVE ELECTRODE SURFACE AREA STYLUS AND COORDINATE DETECTION METHOD THEREFOR

(71) Applicant: Adonit Co., Ltd., Taipei (TW)

(72) Inventors: Jasper Li, Taipei (TW); Reinier Leopold Bloem, Taipei (TW)

(73) Assignee: Adonit Co., Ltd., Taipei (TW)

( * ) Notice: Subject to any disclaimer, the term of this patent is extended or adjusted under 35 U.S.C. 154(b) by 0 days.

(21) Appl. No.: 15/624,707

(22) Filed: Jun. 16, 2017

(51) Int. Cl.
  *G06F 3/00* (2006.01)
  *G06F 3/038* (2013.01)
  *G06F 3/044* (2006.01)
  *G06F 3/0354* (2013.01)
  *G06F 3/041* (2006.01)

(52) U.S. Cl.
  CPC ........ *G06F 3/0383* (2013.01); *G06F 3/03545* (2013.01); *G06F 3/044* (2013.01); *G06F 3/0416* (2013.01)

(58) Field of Classification Search
  CPC .. G06F 3/0416; G06F 3/03545; G06F 3/0383; G06F 3/044
  See application file for complete search history.

(56) References Cited

U.S. PATENT DOCUMENTS

| | | | |
|---|---|---|---|
| 9,195,351 B1* | 11/2015 | Rosenberg | G06F 1/1626 |
| 2016/0179222 A1* | 6/2016 | Chang | G06F 3/03545 345/179 |
| 2017/0068339 A1* | 3/2017 | Zimmerman | G06F 3/0383 |
| 2017/0277284 A1* | 9/2017 | Kim | G06F 3/03545 |

* cited by examiner

*Primary Examiner* — Muhammad N Edun
(74) *Attorney, Agent, or Firm* — eXinpret Consulting Co., Ltd.; Wilfred Y. Asato (57) ABSTRACT

An adjustable effective electrode surface area stylus configured to operate with a capacitive touch sensitive device and coordinate detection method therefor is provided. The stylus comprises an electrode structure comprising a main electrode segment, a sub-electrode segment, a shielding, a switch, and a processing system. The main electrode segment has a main effective electrode surface area and the main electrode segment and sub-electrode segment together form an adjusted effective electrode surface area. The processing system drives the electrode structure to output one stimulation signal having one frequency and a flag and adjust between the output of a main projection of the main electrode surface area having a main central point and an adjusted projection of the adjusted electrode surface area having an adjusted central point. The main central point and adjusted central point projected from the electrode structure is used to calculate tilt and orientation of the stylus.

16 Claims, 8 Drawing Sheets

ADJUSTABLE EFFECTIVE ELECTRODE SURFACE AREA STYLUS AND COORDINATE DETECTION METHOD THEREFOR

BACKGROUND OF THE INVENTION

Field of the Invention

The invention relates to styli and methods therefor, and particularly, relates to adjustable effective electrode surface area styli configured to operate with capacitive touch sensitive devices and coordinate detection methods therefor.

Description of the Related Art

A stylus or a stylus pen is often used as an input device which performs various functions by touching or coming within proximity of a touch screen surface of a touch sensitive device such as a computer, mobile device, graphics tablet, and other devices. With touch sensitive devices, and particularly, capacitive touch sensitive devices, when an object touches or comes within proximity of a surface thereof, a change in capacitance can occur within the touch screen at the location of the touch or proximity. A touch-sensor controller can then process the change in capacitance such that coordinates of the object on the touch screen can be determined and orientation (e.g., azimuth angle and tilt angle) can be calculated for performing operations such as writing, drawing, or making selections by tapping the stylus on the screen. For an active stylus, the projection of stimulation signals sensed by the touch sensitive device can improve accuracy of the coordinates and control of the stylus. However, determining accurate coordinates to calculate orientation while maintaining long battery life is challenging due to the restrictions on size, cost, and power.

Several techniques have been developed for determining coordinates to calculate orientation of a stylus. Some techniques involve detecting capacitance(s) from one or more locations of a stylus relative to a surface of a touch sensitive device, and then using the capacitance(s) to determine coordinates thereof and calculate orientation of the stylus relative to the surface. However, often, in achieving greater coordinate accuracy, complexity of circuitry design and components and/or the amount of components often need to be increased, thus draining batteries. For techniques using less complex circuitry designs and components and/or fewer components requiring smaller power requirements, coordinate accuracy and reliability is often sacrificed.

There is demand for an adjustable effective electrode surface area stylus and coordinate detection method therefor, to solve the aforementioned problems.

BRIEF SUMMARY OF THE INVENTION

Adjustable effective electrode surface area styli configured to operate with capacitive touch sensitive devices and coordinate detection methods therefor are provided.

In an embodiment, an adjustable effective electrode surface area stylus configured to operate with a capacitive touch sensitive device is provided. The stylus comprises an electrode structure comprising a main electrode segment, a sub-electrode segment, a shielding, a switch, and a processing system. The main electrode segment is disposed at a tip-end of the stylus and is comprised of a tip of the stylus and a main electrode inner body, wherein the main electrode inner body has a front end inner body area, a central inner body area and a back end inner body area. In an embodiment, the sub-electrode segment is disposed completely surrounding the main electrode inner body. In an embodiment, the shielding is disposed between the main electrode inner body and sub-electrode segment, electrically shielding the main electrode inner body from the sub-electrode segment. In the embodiment, the shielding surrounds the central inner body area and a back end inner body area of the main electrode segment. In an embodiment, the switch is disposed in a connection area directly adjacent to the shielding and partially between the main electrode inner body and sub-electrode segment, surrounding the front end inner body area of the main electrode segment. The switch is electrically coupled to the main electrode segment and sub-electrode segment and has an INACTIVE state and an ACTIVE state, wherein when the switch is in the INACTIVE state the main electrode segment is electrically insulated from the sub-electrode segment and when the switch is in the ACTIVE state the main electrode segment is electrically coupled to the sub-electrode segment. The main electrode segment has a main effective electrode surface area and the sub-electrode segment has a sub-effective electrode surface area. The main electrode surface area and sub-electrode surface area together form an adjusted effective electrode surface area. The electrode structure is configured to switch between activation of the main effective electrode surface area (INACTIVE switch state) and adjusted effective electrode surface area (ACTIVE switch state).

In another embodiment, another adjustable effective electrode surface area stylus configured to operate with a capacitive touch sensitive device is provided. The stylus comprises an electrode structure comprising a main electrode segment, a sub-electrode segment, a shielding, a switch, and a processing system. The main electrode segment is disposed at a tip-end of the stylus and is comprised of a tip of the stylus and a main electrode inner body, wherein the main electrode inner body has a front end inner body area, a central inner body area and a back end inner body area. In an embodiment, the sub-electrode segment is disposed surrounding the central inner body area and a back end inner body area of the main electrode segment. In an embodiment, the shielding is disposed between the main electrode inner body and sub-electrode segment, electrically shielding the main electrode inner body from the sub-electrode segment. In the embodiment, the shielding completely surrounds the main electrode inner body of the main electrode segment. In an embodiment, the switch is disposed in a connection area directly adjacent to the shielding and partially between the main electrode inner body and sub-electrode segment, surrounding the front end inner body area of the main electrode segment and is separated therefrom by a portion of the shielding. The switch is electrically coupled to the main electrode segment and sub-electrode segment and has an INACTIVE state and an ACTIVE state, wherein when the switch is in the INACTIVE state the main electrode segment is electrically insulated from the sub-electrode segment and when the switch is in the ACTIVE state the main electrode segment is electrically coupled to the sub-electrode segment. The main electrode segment has a main effective electrode surface area and the sub-electrode segment has a sub-effective electrode surface area. The main electrode surface area and sub-electrode surface area together form an adjusted effective electrode surface area. The electrode structure is configured to switch between activation of the main effective electrode surface area (INACTIVE switch state) and adjusted effective electrode surface area (ACTIVE switch state).

In the embodiments, the processing system disposed in the housing of the stylus comprises a processing system circuit assembly comprising a dock, an amplifier, a microcontroller, a non-transitory computer-readable medium storing program instructions that, when executed by the microcontroller configured to interact with the capacitive touch sensitive device, causes the microcontroller to perform the steps of the embodiments, and a power source providing power to at least the microcontroller. The clock provides a sequence of pulses. The microcontroller is coupled to the amplifier, electrode structure, clock and switch, and generates one stimulation signal having one frequency and one flag and controls at least the one stimulation signal and switch. The amplifier is coupled to the electrode structure and microcontroller to amplify the one stimulation signal to the electrode structure. In an embodiment, the steps of the non-transitory computer-readable medium storing program instructions of the stylus comprise: S1) powering on; S2) turning on an amplifier and resetting a counter; S3) continuously generating one stimulation signal having one frequency and a flag to the electrode structure while switching between activation of the main electrode segment and adjusted electrode segment; S4) continuously outputting the one stimulation signal and switching between the main electrode segment and adjusted electrode segment, projecting the main capacitive projection having the main central point and the adjusted capacitive projection having the adjusted central point, respectively; S5) determining if a main time has expired; and S6) powering off.

In further embodiments, the circuit assembly of the processing system disposed in the housing of the stylus further comprises a sensing element, in addition to a dock, an amplifier, a microcontroller, a non-transitory computer-readable medium storing program instructions that, when executed by the microcontroller configured to interact with the capacitive touch sensitive device, causes the microcontroller to perform the steps of the embodiments, and a power source providing power to at least the microcontroller. The sensing element is in close proximity with the electrode structure and coupled to the microcontroller to sense tip pressure of the stylus. The dock provides a sequence of pulses. The microcontroller is coupled to the electrode structure, sensing element, amplifier, dock and switch, generating one stimulation signal having one frequency and one flag and controlling at least the one stimulation signal, amplifier and switch. The amplifier is coupled to the electrode structure and microcontroller to amplify the one stimulation signal to the electrode structure. In an embodiment, the steps of the non-transitory computer-readable medium storing program instructions of the stylus comprise: S1) powering on; S2) starting a clock and resetting a counter; S3) continuously generating one stimulation signal having one frequency and a flag to the main electrode segment of the electrode structure; S4) continuously outputting the one stimulation signal having one frequency and a flag from the main electrode segment, projecting the main capacitive projection having the main central point; S5) determining if a main time has expired; S6) sensing tip pressure; S7) determining a start condition; S8) turning on an amplifier and resetting a counter; S9) continuously generating one stimulation signal having one frequency and a flag to the electrode structure while switching between activation of the main electrode segment and adjusted electrode segment; S10) continuously outputting the one stimulation signal and switching between the main electrode segment and adjusted electrode segment, projecting the main capacitive projection having the main central point and the adjusted capacitive projection having the adjusted central point, respectively; S11) determining a stop condition; S12) determining if an adjusted time has expired; S13) turning off the amplifier; and S14) powering off.

In an embodiment, a method for detecting an adjustable effective electrode surface area stylus configured to operate with a capacitive touch sensitive device is provided. The method comprises: detecting coordinates of a main central point of a main capacitive projection generated by a main electrode segment of an electrode structure of the stylus; detecting coordinates of an adjusted central point of an adjusted capacitive projection generated by an adjusted electrode segment of the electrode structure of the stylus; and calculating tilt and orientation of the stylus based on the coordinates.

In the embodiments, the processing system is electrically coupled to and drives the electrode structure to output one stimulation signal having one frequency and a flag having two settings of '0' and '1' and adjust between the output of a main capacitive projection having a main central point when the switch is in the INACTIVE state (main effective electrode surface area activation) and an adjusted capacitive projection having an adjusted central point when the switch is in the ACTIVE state (adjusted effective electrode surface area activation), wherein the projected location of the main central point is different from that of the adjusted central point, and wherein when the switch is set to the INACTIVE state the flag of the one stimulation signal is set to '0' and when the switch is set to the ACTIVE state the flag of the one stimulation signal is set to '1'. A capacitive touch sensitive device receives the one stimulation signal at one frequency from the stylus and determines the coordinates of the main central point when the flag received with the one stimulation signal is set to '0' and adjusted central point when the flag received with the one stimulation signal is set to '1' to calculate tilt and orientation of the stylus.

The electrode structure of the embodiments, allow a stylus which has simplified circuitry design and minimal components, to output a main capacitive projection having a main central point and an adjusted capacitive projection having an adjusted central point, by a switch in the electrode structure. Furthermore, only one stimulation signal having one frequency and a flag is required to determine accurate and reliable coordinates and calculate orientation of the stylus.

Stylus orientation can be used to affect width and darkness of a line displayed on the touch screen surface of a touch sensitive device, thereby improving the stylus experience. The adjustable effective electrode surface area stylus of the embodiments can be used to improve the sensing of an object touching or coming within proximity of a surface of a touch sensitive device, while maintaining long battery life.

BRIEF DESCRIPTION OF THE DRAWINGS

The accompanying drawings, which are incorporated herein and form a part of the Detailed Description of the Invention, illustrate various embodiments of the present invention and, together with the Detailed Description of the Invention, serve to explain principles discussed below. The drawings referred to in this Brief Description of Drawings should not be understood as being drawn to scale unless specifically noted.

DETAILED DESCRIPTION OF THE INVENTION

It is understood that the following disclosure provides many different embodiments, or examples, for implementing different features of the invention. Specific examples of devices and arrangements are described below to simplify the present disclosure. These are, of course, merely examples and are not intended to be limiting. For example, the formation of a first feature over or on a second feature in the description that follows can include embodiments in which the first and second features are formed in direct contact, and can also include embodiments in which additional features are formed between the first and second features, such that the first and second features are not in direct contact. In addition, the present disclosure can repeat reference numerals and/or letters in the various examples. This repetition is for the purpose of simplicity and clarity and does not in itself dictate a relationship between the various embodiments and/or configurations discussed. It is intended that the scope of the present technology be defined by the claims appended hereto and their equivalents.

Embodiments of the invention generally relate to apparatuses and methods that are used to actively control the interaction of a handheld device with a touch sensitive device, such as a graphics tablet. Embodiments of the invention provide a universal handheld device that is able to provide input to any type of capacitive touch sensitive device, regardless of the manufacturer or, in some embodiments, knowledge of the capacitive touch sensitive device manufacturer's specific capacitive touch-sensing detection techniques. In general, the handheld device disclosed herein is an electronic stylus, or also referred to herein as simply a "stylus," that a user uses to provide input to control some aspect of the touch sensitive device. In some configurations, the "stylus" includes an "active stylus" that is configured to actively alter the capacitive sensing signal generated by the touch sensing components in the capacitive touch sensitive device, so that an active portion of the active stylus, such as its tip-end area, is sensed as an input object by the capacitive touch sensitive device.

Embodiments of the invention can be implemented in numerous ways, including a computer program product embodied on a non-transitory computer-readable storage medium and/or a processor, such as a microprocessor configured to execute instructions stored on and/or provided by a non-transitory computer-readable medium coupled to the microprocessor. In this specification, these implementations, or any other form that the invention can take, can be referred to as techniques. In general, the order of the steps of disclosed processes can be altered within the scope of the invention. Unless stated otherwise, a component such as a microprocessor or a memory described as being configured to perform a task can be implemented as a general component that is temporarily configured to perform the task at a given time or a specific component that is manufactured to perform the task.

According to embodiments described herein, an adjustable effective electrode surface area stylus configured to operate with a capacitive touch sensitive device and coordinate detection method therefor is provided. The stylus comprises an electrode structure comprising a main electrode segment, a sub-electrode segment, a shielding, a switch, and a processing system. The main electrode segment has a main effective electrode surface area and the surface area of the main electrode segment and sub-electrode segment together form an adjusted effective electrode surface area. The processing system drives the electrode structure to output one stimulation signal having one frequency and a flag and adjust between the outputs of a main projection of the main electrode surface area having a main central point an adjusted projection of the adjusted electrode surface area having an adjusted central point. The main central point and adjusted central point projected from the electrode structure is used to calculate tilt and orientation of the stylus.

Figure 1:
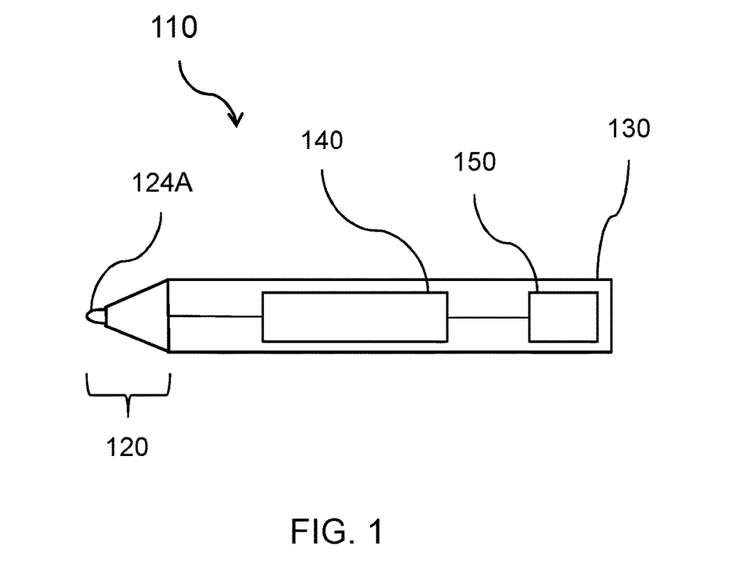
FIG. 1 a sectional view illustrating an adjustable effective electrode surface area stylus for use with a touch sensitive device according to various embodiments.

FIG. 1 is a sectional view illustrating an adjustable effective electrode surface area stylus for use with a touch sensitive device according to various embodiments. As shown in FIG. 1, stylus 110 can comprise a housing 130 and a tip-end 120. The tip-end 120 can be comprised of an electrode structure having a tip 124A for contacting a surface of a capacitive touch sensitive device. In the embodiments, the tip 124A can be cylindrical with a rounded end; however, the embodiments are not limited thereto. The tip 124A can also be other shapes such as conical with a rounded end, or other shapes according to other embodiments. The electrodes of the electrode structure can be any suitable conductive material, such as metal, conductive paint, conductive ink, and the like. In some embodiments, the tip 124A can be replaceable. The housing 130 can similarly be any suitable conductive material or any suitable insulating material, depending on the requirements of the stylus 110. The housing 130 can house stylus circuitry, e.g., sensing elements, signal processing elements, and the like, depending on the requirements of the stylus 110.

Figure 2:
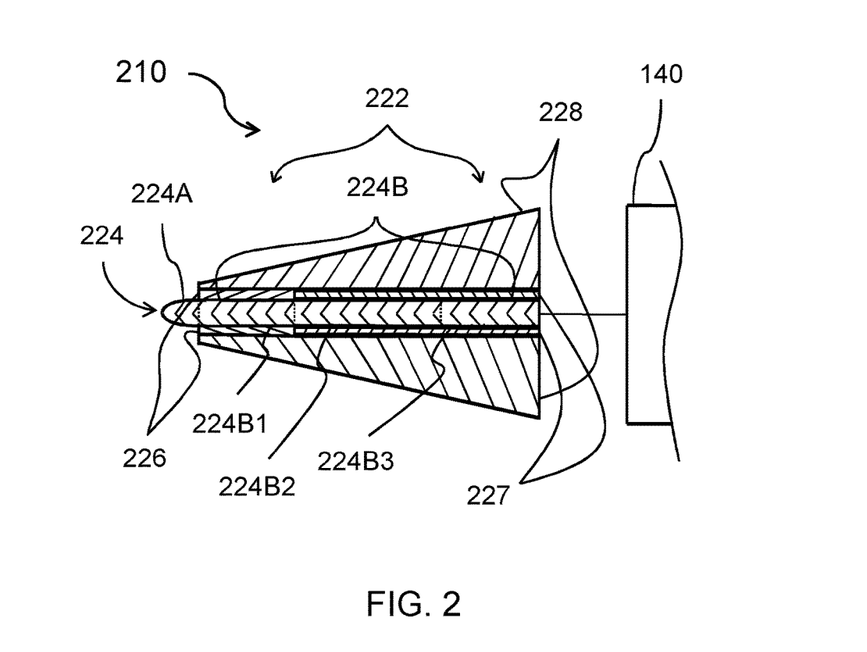
FIG. 2 illustrates a cross-sectional view of an electrode structure of an adjustable effective electrode surface area stylus according to various embodiments.

FIG. 2 illustrates a cross-sectional view of an electrode structure of an adjustable effective electrode surface area stylus according to various embodiments. As shown in FIG. 2, in an embodiment, an adjustable effective electrode surface area stylus configured to operate with a capacitive touch sensitive device is provided. The stylus 210 comprises an electrode structure 222 comprising a main electrode segment 224, a sub-electrode segment 228, a shielding 227, a switch 226, and a processing system 140. The main electrode segment 224 is disposed at a tip-end of the stylus 210 and is comprised of a tip 224A and a main electrode inner body 224B, wherein the main electrode inner body 224B has a front end inner body area 224B1, a central inner body area 224B2 and a back end inner body area 224B3. In an embodiment, the sub-electrode segment 228 is disposed completely surrounding the main electrode inner body 224B. In an embodiment, the shielding 227 is disposed between the main electrode inner body 224B and sub-electrode segment 228, electrically shielding the main electrode inner body 224B from the sub-electrode segment 228. In the embodiment, the shielding 227 surrounds the central inner body area 224B2 and a back end inner body area 224B3 of the main electrode segment 224. In an embodiment, the shielding 227 can comprise any suitable conductive material such as metal or the like. In an embodiment, the switch 226 is disposed in a connection area directly adjacent to the shielding 227 and partially between the main electrode inner body 224B and sub-electrode segment 228, surrounding the front end inner body area 224B1 of the main electrode segment 224. The switch 226 is electrically coupled to the main electrode segment 224 and sub-electrode segment 228 and has an INACTIVE state and an ACTIVE state, wherein when the switch 226 is in the INACTIVE state the main electrode segment 224 is electrically insulated from the sub-electrode segment 228 and when the switch 226 is in the ACTIVE state the main electrode segment 224 is electrically coupled to the sub-electrode segment 228. In an embodiment, the switch 226 can be implemented using a wire; however, the embodiments are not limited thereto. The switch 226 can be implemented using a PCB trace or other like functional elements or techniques can be used according to the embodiments of the invention. The main electrode segment 224 has a main effective electrode surface area and the sub-electrode segment 228 has a sub-effective electrode surface area. The main electrode surface area and sub-electrode surface area together form an adjusted effective electrode surface area. The electrode structure 222 is configured to switch between activation of the main effective electrode surface area (INACTIVE switch state) and adjusted effective electrode surface area (ACTIVE switch state).

Figure 3:
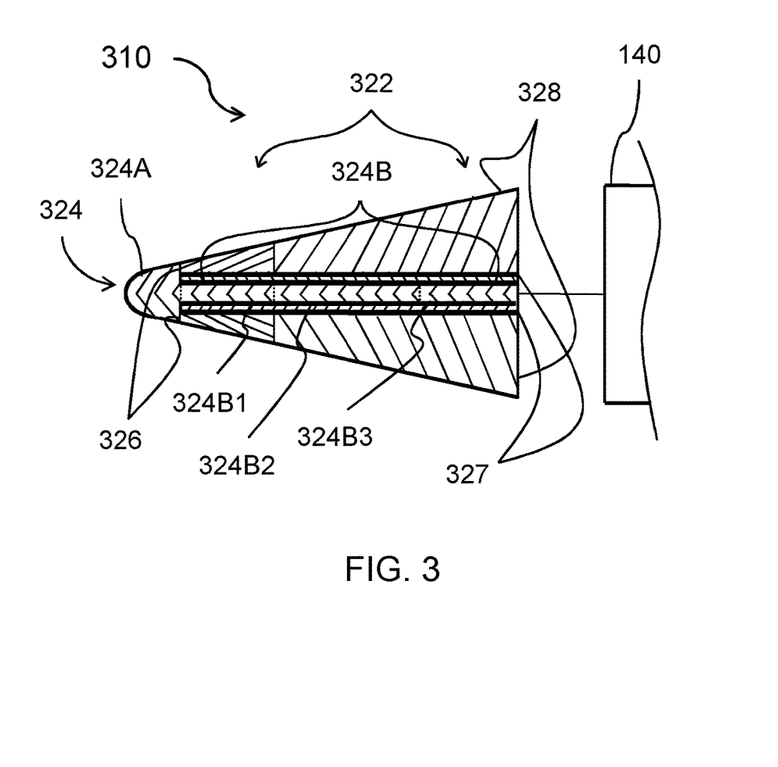
FIG. 3 illustrates a cross-sectional view of another electrode structure of an adjustable effective electrode surface area stylus according to various embodiments.

FIG. 3 illustrates a cross-sectional view of another electrode structure of an adjustable effective electrode surface area stylus according to various embodiments. As shown in FIG. 3, in another embodiment, another adjustable effective electrode surface area stylus configured to operate with a capacitive touch sensitive device is provided. The stylus 310 comprises an electrode structure 322 comprising a main electrode segment 324, a sub-electrode segment 328, a shielding 327, a switch 326, and a processing system 140. The main electrode segment 324 is disposed at a tip-end of the stylus 310 and is comprised of a tip 324A and a main electrode inner body 324B, wherein the main electrode inner body 324B has a front end inner body area 324B1, a central inner body area 324B2 and a back end inner body area 324B3. In an embodiment, the sub-electrode segment 328 is disposed surrounding the central inner body area 324B2 and a back end inner body area 324B3 of the main electrode segment 324. In an embodiment, the shielding 327 is disposed between the main electrode inner body 324B and sub-electrode segment 328, electrically shielding the main electrode inner body 324B from the sub-electrode segment 328. In the embodiment, the shielding 327 completely surrounds the main electrode inner body 324B of the main electrode segment 324. In an embodiment, the shielding 227 can comprise any suitable conductive material such as metal or the like. In an embodiment, the switch 326 is disposed in a connection area directly adjacent to the shielding 327 and partially between the main electrode inner body 324B and sub-electrode segment 328, surrounding the front end inner body area 324B1 of the main electrode segment 324 and is separated therefrom by a portion of the shielding 327. The switch 326 is electrically coupled to the main electrode segment 324 and sub-electrode segment 328 and has an INACTIVE state and an ACTIVE state, wherein when the switch 326 is in the INACTIVE state the main electrode segment 324 is electrically insulated from the sub-electrode segment 328 and when the switch 326 is in the ACTIVE state the main electrode segment 324 is electrically coupled to the sub-electrode segment 328. In an embodiment, the switch 326 can be implemented using a wire; however, the embodiments are not limited thereto. The switch 326 can be implemented using a PCB trace or other like functional elements or techniques can be used according to the embodiments of the invention. The main electrode segment 324 has a main effective electrode surface area and the sub-electrode segment 328 has a sub-effective electrode surface area. The main electrode surface area and sub-electrode surface area together form an adjusted effective electrode surface area. The electrode structure 322 is configured to switch between activation of the main effective electrode surface area (INACTIVE switch state) and adjusted effective electrode surface area (ACTIVE switch state).

Figure 4:
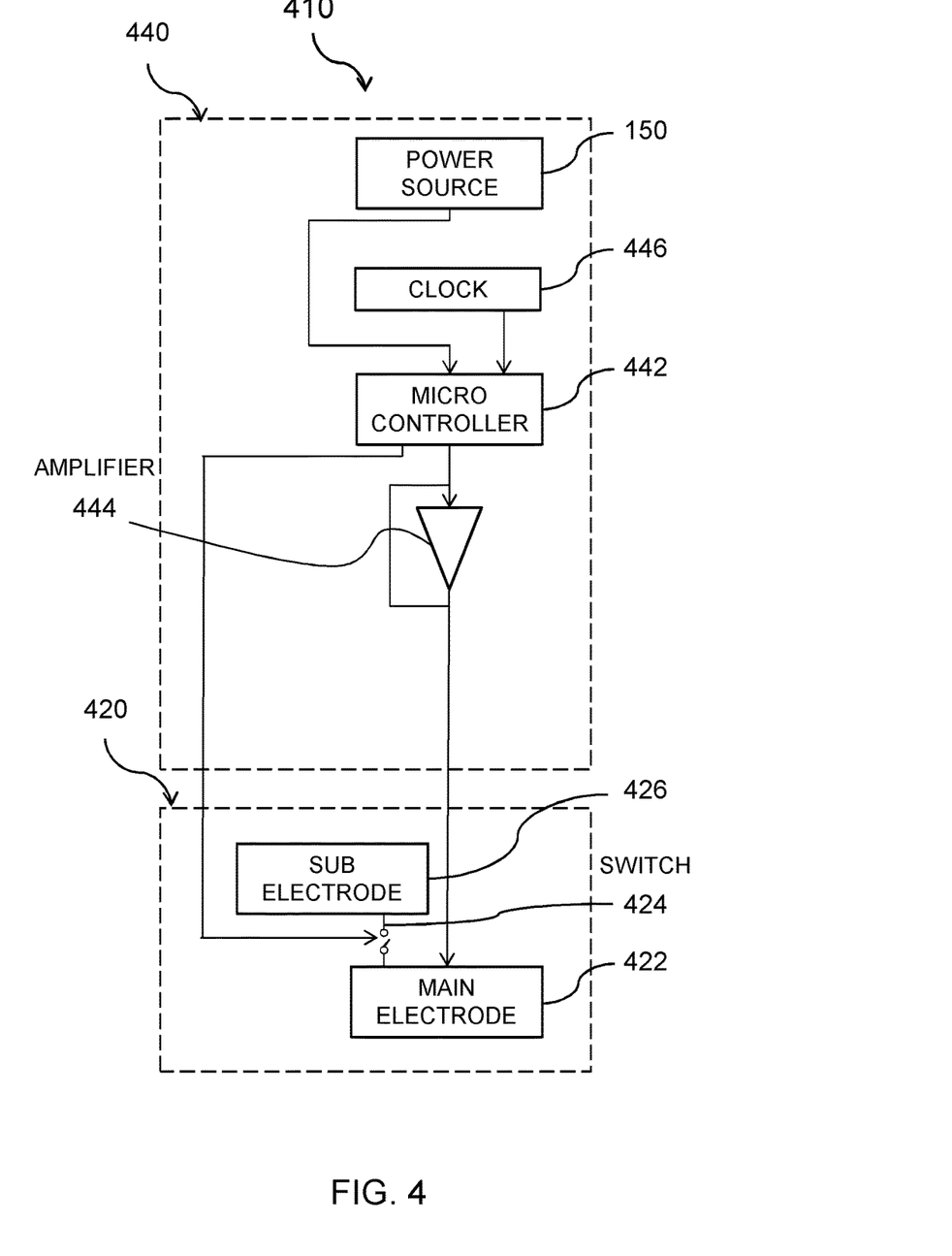
FIG. 4 is a schematic illustrating circuitry for an adjustable effective electrode surface area stylus according to various embodiments.

FIG. 4 is a schematic illustrating circuitry for an adjustable effective electrode surface area stylus according to various embodiments. As shown in FIG. 4, in the embodiments, stylus circuitry 410 comprises a processing system circuitry 440 and an electrode structure circuitry 420. The processing system circuitry 440 is disposed in a housing of a stylus and comprises a dock 446, an amplifier 444, a microcontroller 442, a non-transitory computer-readable medium storing program instructions that, when executed by the microcontroller configured to interact with the capacitive touch sensitive device, causes the microcontroller to perform the steps of the invention, and a power source 150 providing power to at least the microcontroller 442. In an embodiment, the non-transitory computer-readable medium is included in the microcontroller; however, the embodiments are not limited thereto. In other embodiments, the non-transitory computer-readable medium can be implemented in a separate memory or other like functional elements or techniques can be used according to embodiments. In an embodiment, the power source 150 can be a built-in battery inside the stylus; however, the embodiments are not limited thereto. Other suitable power sources can be implemented to provide power to the stylus according to embodiments. The clock 446 provides a sequence of pulses. In the embodiments, the clock 446 can have a dock period, and the clock 446 can generate a periodic electronic signal. The clock period can be approximately equal to a duration of one cycle of the clock, which can be referred to as a clock cycle. The frequency of the clock can be approximately equal to the reciprocal of the clock period. Note that the particular frequencies, clock periods, formats, and duty cycles of the clock 446 are not limited, and the clock can have any suitable frequencies, dock periods, formats, and duty cycles, generating a periodic electronic signal according to other embodiments. The microcontroller 442 is coupled to the amplifier 444, electrode structure circuitry 420, clock 446 and switch 424, and generates one stimulation signal having one frequency and one flag and controls at least the one stimulation signal and switch 424. The amplifier 444 is coupled to the electrode structure 420 and microcontroller 442 to amplify the one stimulation signal to the electrode structure circuit assembly 420.

Figure 5:
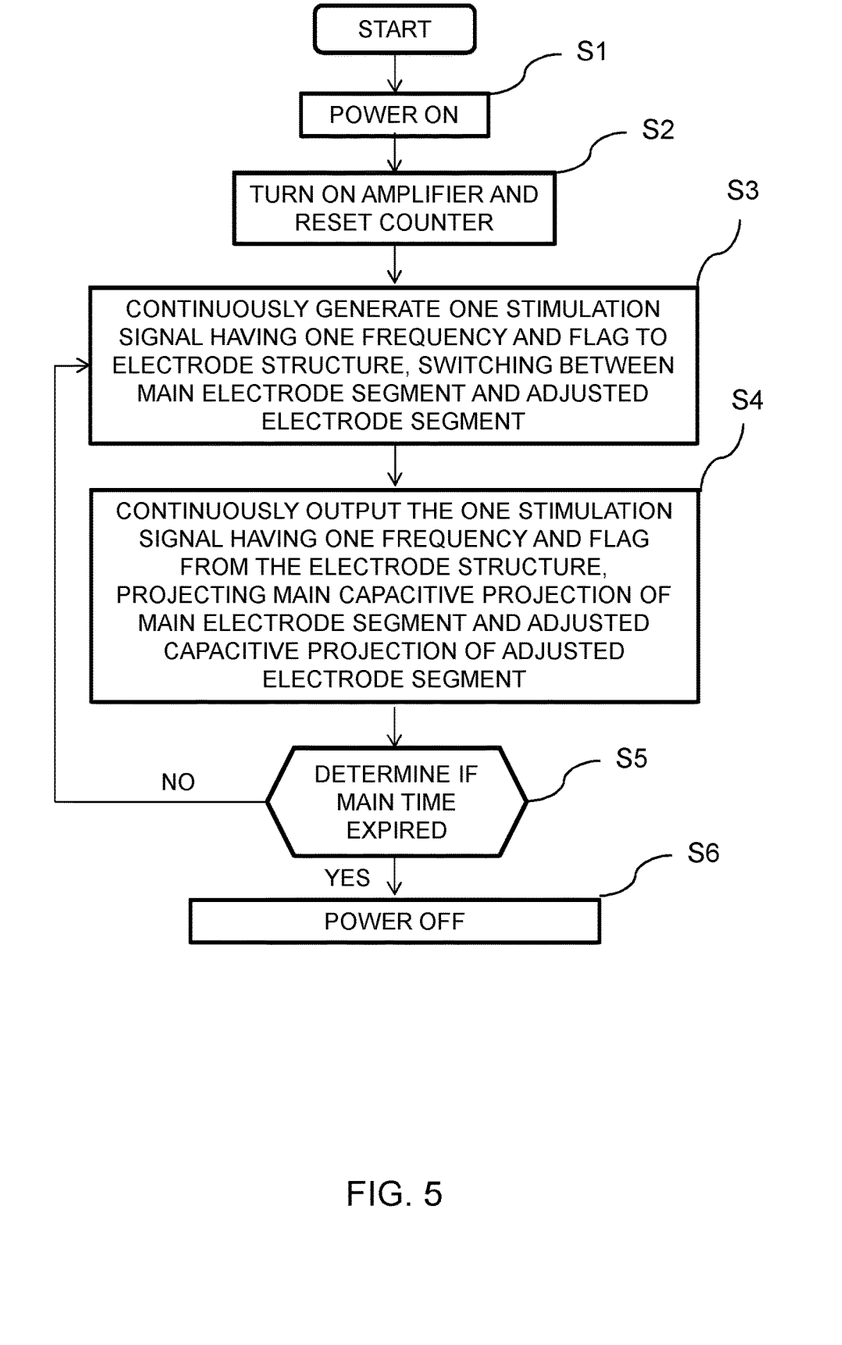
FIG. 5 is a flowchart illustrating steps for controlling a signal having one frequency and a flag of the adjustable effective electrode surface area stylus according to various embodiments.

FIG. 5 is a flowchart illustrating steps for controlling a signal having one frequency and a flag of an adjustable effective electrode surface area stylus according to various embodiments. In the embodiments, the method can be used with the styli of FIGS. 1, 2, 3 and 4. In an embodiment, a stylus is first powered on (Step 1, S1). Next, an amplifier is turned on and a counter is reset (Step 2, S2). After, one stimulation signal having one frequency and a flag is continuously generated to the electrode structure while switching between activation of the main electrode segment and adjusted electrode segment (Step 3, S3). Thereafter, the one stimulation signal having one frequency and a flag is continuously output from the main electrode segment and adjusted electrode segment, projecting the main capacitive projection having the main central point and the adjusted capacitive projection having the adjusted central point, respectively (Step 4, S4). In an embodiment the main central point is generated and output more than once, before the adjusted central point is generated and output for a shorter period, and the cycle is repeated; however, the embodiments are not limited thereto. Generation and output of the main central point and the adjusted central point can be predetermined to be in any sequence or order according to other embodiments. Next, the counter is checked to see if a main time has expired (Step 5, S5). If the main time has not expired (NO), Step 3, S3 to Step 5, S5 is continually repeated until the main time expires (YES). After the main time is determined to have expired (YES), the stylus is powered off (Step 6, S6).

Figure 6:
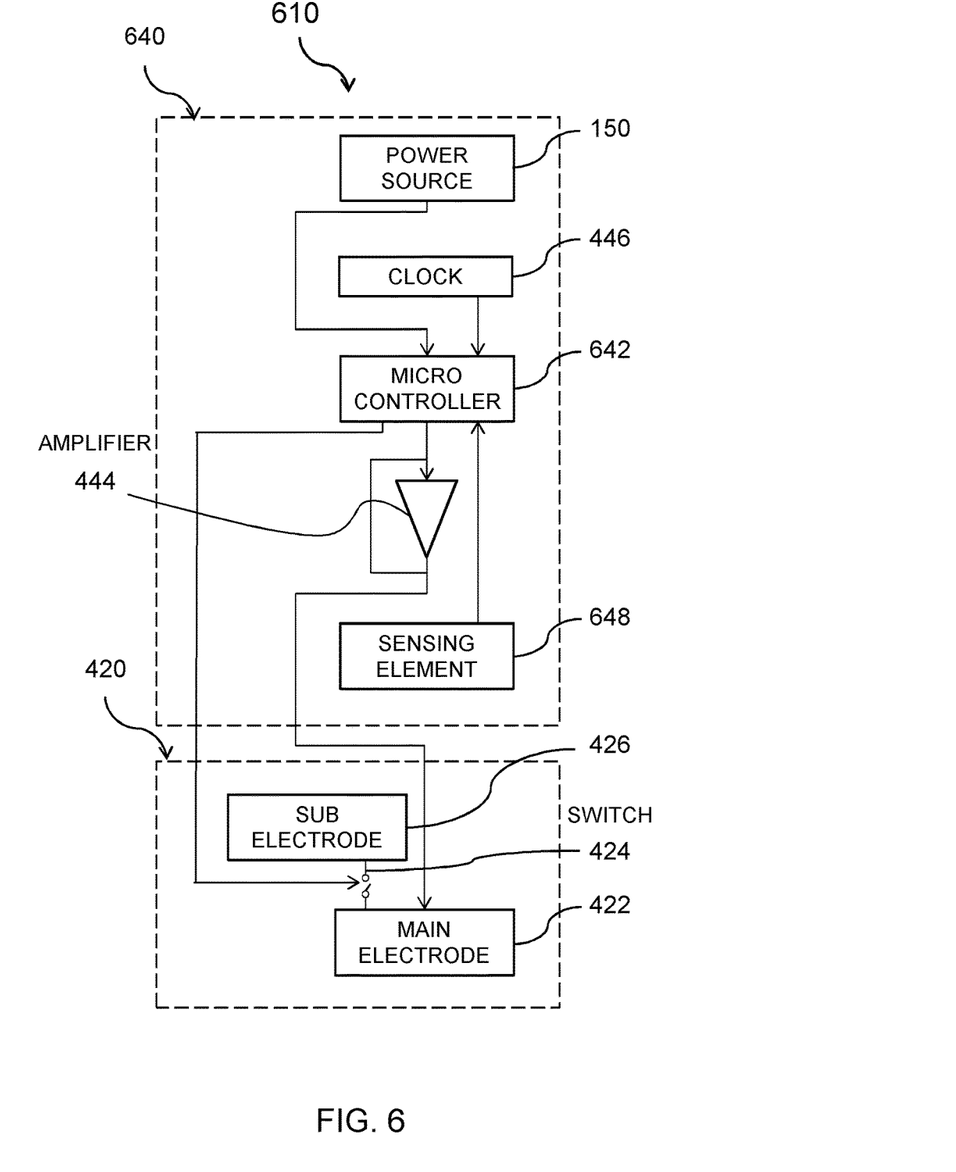
FIG. 6 is a schematic illustrating circuitry for another adjustable effective electrode surface area stylus according to various embodiments.

FIG. 6 is a schematic illustrating circuitry for another adjustable effective electrode surface area stylus according to various embodiments. As shown in FIG. 6, in the embodiments, stylus circuitry 610 comprises a processing system circuitry 640 and the electrode structure circuitry 420. The processing system circuitry 640, disposed in the housing of the stylus, further comprises a sensing element 648, in addition to the clock 446, the amplifier 444, a microcontroller 642, a non-transitory computer-readable medium storing program instructions that, when executed by the microcontroller configured to interact with the capacitive touch sensitive device, causes the microcontroller to perform the steps of the invention, and the power source 150 providing power to at least the microcontroller 642. In an embodiment, the power source 150 can be a built-in battery inside the stylus; however, the embodiments are not limited thereto. Other suitable power sources can be implemented to provide power to the stylus according to embodiments. In an embodiment, the non-transitory computer-readable medium is included in the microcontroller; however, the embodiments of the invention are not limited thereto. In other embodiments, the non-transitory computer-readable medium can be implemented in a separate memory or other like functional elements or techniques can be used according to embodiments. The sensing element 648 is in close proximity with the electrode structure 420 and coupled to the microcontroller 642 to sense tip pressure of the stylus 610. In an embodiment, the sensing element 648 is implemented using a spring-loaded contact member, coupled to the electrode structure 420 and microcontroller 642; however, the embodiments are not limited thereto. A contact switch can be implemented to couple to the electrode structure 420 and microcontroller 642 or other like functional elements according to other embodiments. The clock 446 provides a sequence of pulses and the amplifier 444 is coupled to the electrode structure 420 and microcontroller 642 to amplify the one stimulation signal to the electrode structure 420. In the embodiments, the clock 446 can have a dock period, and the clock 446 can generate a periodic electronic signal. The dock period can be approximately equal to a duration of one cycle of the dock, which can be referred to as a dock cycle. The frequency of the dock can be approximately equal to the reciprocal of the clock period. Note that the particular frequencies, dock periods, formats, and duty cycles of the dock 446 are not limited, and the clock can have any suitable frequencies, clock periods, formats, and duty cycles, generating a periodic electronic signal according to other embodiments. The microcontroller 642 is coupled to the electrode structure 420, sensing element 648, amplifier 444, dock 446 and switch 424, generating one stimulation signal having one frequency and one flag and controlling at least the one stimulation signal, amplifier 444 and switch 424.

Figure 7A:
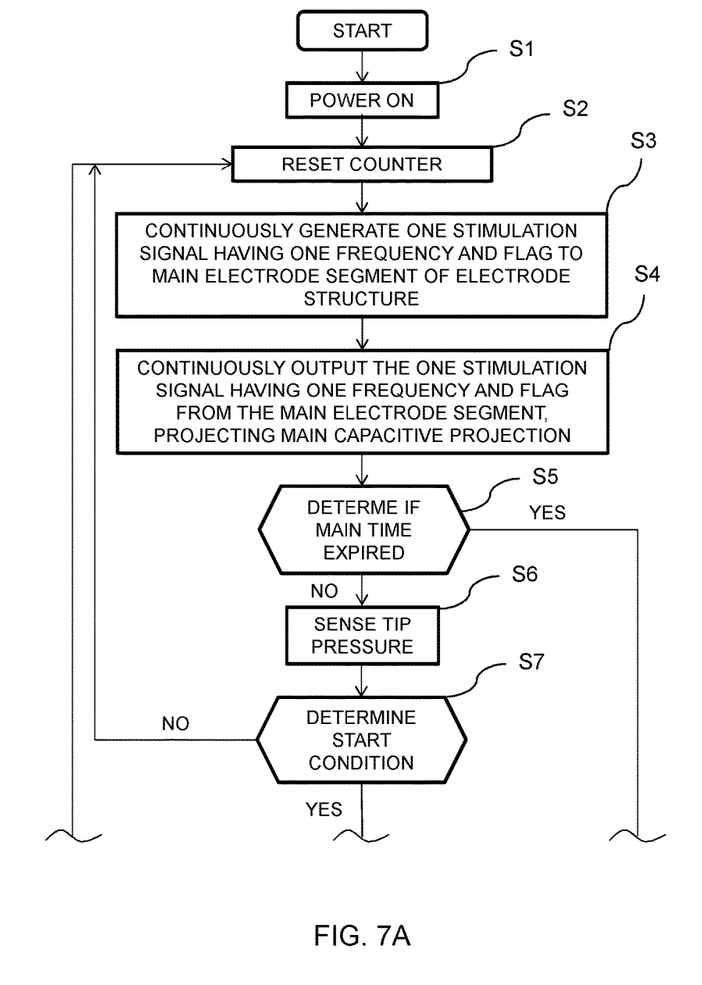
FIGS. 7A and 7B are flowcharts illustrating another set of steps for controlling a signal having one frequency and a flag of an adjustable effective electrode surface area stylus according to various embodiments.
Figure 7B:
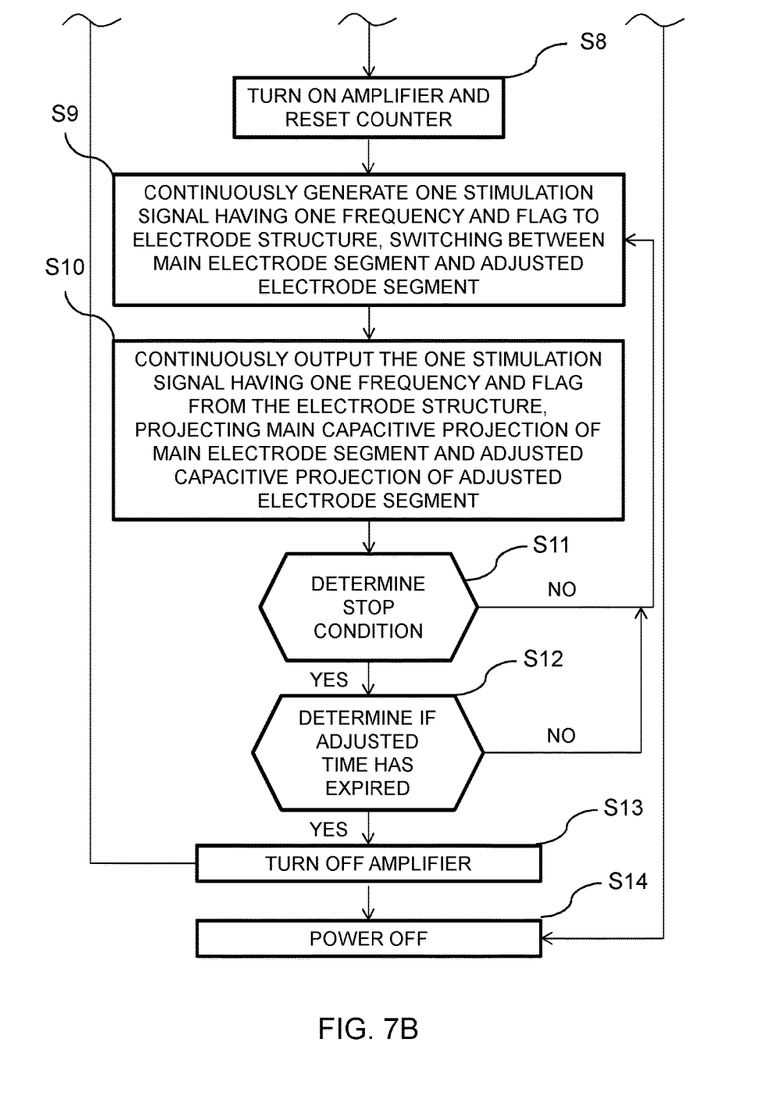

FIGS. 7A and 7B are flowcharts illustrating another set of steps for controlling a signal having one frequency and a flag of an adjustable effective electrode surface area stylus according to various embodiments. In the embodiments, the method can be used with the styli of FIGS. 1, 2, 3 and 6. In an embodiment, a stylus is first powered on (Step 1, S1). Next, the clock resets a counter (Step 2, S2). Following, one stimulation signal having one frequency and a flag is continuously generated to the main electrode segment of the electrode structure (Step 3, S3). Thereafter, the one stimulation signal having one frequency and a flag is continuously output from the main electrode segment, projecting the main capacitive projection having the main central point (Step 4, S4). Note at this time, the amplifier has yet to be turned on to save power. Next, the counter is checked to see if a main time has expired (Step 5, S5). If the main time has expired (YES), the stylus is powered off (Step 14, S14). If the main time has not expired (NO), the stylus continues to sense for tip pressure (Step 6, S6). Following, when tip pressure is sensed, a start condition is determined (Step 7, S7). The start condition can be a pressure threshold of the tip pressure. In an embodiment, if the pressure threshold surpasses a predetermined level, the start condition is determined to have been started. If not, Step 2, S2 to Step 7, S7 is continually repeated until the stylus is powered off (Step 14, S14) or the pressure threshold surpasses the predetermined level and the steps move to Step 8, S8. Note that the threshold can be set to any suitable threshold level according to embodiments. Following determination of the start condition, an amplifier is turned on and the counter is reset (Step 8, S8). Note that only after it is determined that the tip of the stylus is in contact with a surface, as indicated by the surpassing of the predetermined pressure threshold level, will the amplifier be turned on. Next, one stimulation signal having one frequency and a flag is continuously generated to the electrode structure while switching between activation of the main electrode segment and adjusted electrode segment (Step 9, S9). Thereafter, the one stimulation signal having one frequency and a flag is continuously output from the main electrode segment and adjusted electrode segment, projecting the main capacitive projection having the main central point and the adjusted capacitive projection having the adjusted central point, respectively (Step 10, S10). In an embodiment the main central point is generated and output more than once, before the adjusted central point is generated and output for a shorter period, and the cycle is repeated; however, the embodiments are not limited thereto. Generation and output of the main central point and the adjusted central point can be predetermined to be in any sequence or order according to other embodiments. Next, a stop condition is determined (Step 11, S11). The stop condition can be the pressure threshold of the tip pressure. In an embodiment, if the pressure threshold fails to surpass the predetermined level (YES), the stop condition is determined to have been initiated. If not (NO), Step 9, S9 to Step 11, S11 is continually repeated until the stylus is powered off (Step 14, S14) or the pressure threshold fails to surpass the predetermined level (YES) and the steps move to Step 12, S12. Next, the counter is checked to see if an adjusted time has expired (Step 12, S12). If the adjusted time has not expired (NO), Step 9, S9 to Step 12, S12 is continually repeated until the stylus is powered off (Step 14, S14) or until the adjusted time expires (YES). After the adjusted time is determined to have expired (YES), the amplifier is turned off (Step 13, S13) and Step 2, S2 to Step 13 is repeated until the stylus is powered off (Step 14, S14).

Figure 8:
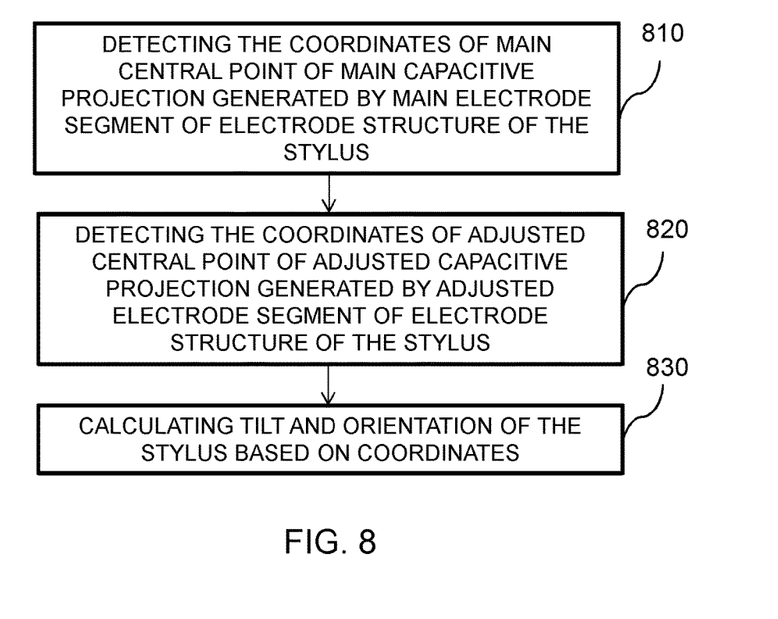
FIG. 8 is a flowchart illustrating a method for detecting an orientation of an adjustable effective electrode surface area stylus according to various embodiments.

FIG. 8 is a flowchart illustrating a method for detecting an orientation of an adjustable effective electrode surface area stylus according to various embodiments. In the embodiments, the method can be used with the styli of FIGS. 1, 2, 3, 4, 5, 6, and 7A and 7B. In the embodiments, the method can be implemented by software or firmware on a capacitive touch sensitive device. In an embodiment, a main capacitance projection output from a main electrode segment of the electrode structure of the stylus is detected (Block 810). The detection can be by the stylus touching or coming within proximity of a touch screen surface of a touch sensitive device. Similarly, at a separate timing, an adjusted capacitance projection output from an adjusted electrode segment of the electrode structure of the stylus is detected (Block 820). In an embodiment, the main capacitance projection is output from the main electrode segment comprising a tip of the stylus and a main electrode inner body and the adjusted capacitance projection is output from the adjusted electrode segment comprising the main electrode segment comprising the tip of the stylus and the main electrode inner body and a sub-electrode segment. In the embodiments, one stimulation signal having one frequency and a flag having two settings of '0' and '1' is output by the stylus; however, the embodiments are not limited thereto. The stimulation signal having one frequency can have one or more flags and can also comprise other information according to other embodiments. Note that in the embodiments, while a detection event is generated by one stimulation signal having one frequency and a flag of the stylus, the invention is not limited thereto. A detection event can be generated by software or firmware on the capacitive touch sensitive device in response to an evaluation of a stream of signals received from the stylus according to other embodiments.

In the embodiments, the processing system of the stylus controls a switch therein, to switch between an INACTIVE state and an ACTIVE state. When the switch is in the INACTIVE state, the main electrode segment of the electrode structure of the stylus is activated and the processing system of the stylus generates and outputs the main capacitance projection along with a flag set to '0', indicating that the capacitance projection is the main capacitance projection. When the switch is in the ACTIVE state, the main electrode segment and the sub-electrode segment of the electrode structure of the stylus is activated and the processing system of the stylus generates and outputs the adjusted capacitance projection along with a flag set to '1', indicating that the capacitance projection is the adjusted capacitance projection. The flag is used for determination of whether the capacitance projection detected by the touch sensitive device is the main capacitance projection or adjusted capacitance projection; however, the embodiment is not limited thereto. In other embodiments, the flag can be implemented to represent other indicators according to other embodiments.

In the embodiments, the capacitance projections detected by the touch sensitive device can be in the shape of an image showing the stylus touching or coming within proximity of the touch screen surface of the touch sensitive device. Suitable image processing methods can be performed on the captured images to determine coordinates of a main central point of the main capacitance projection and an adjusted central point of the adjusted capacitance projection on the touch screen surface. Suitable image processing methods can comprise look up tables or equations, wherein one equation calculates tilt angle as a function of proximity and another equation calculates tilt direction as a function of relative position; however, the embodiments are not limited thereto. Other orientation calculation methods can be implemented according to other embodiments.

The electrode structure of the embodiments, allow a stylus which has simplified circuitry design and minimal components, to output a main capacitive projection having a main central point and an adjusted capacitive projection having an adjusted central point, by a switch in the electrode structure. Furthermore, only one stimulation signal having one frequency and a flag is required to determine accurate and reliable coordinates and calculate orientation of the stylus.

Stylus orientation can be used to affect width and darkness of a line displayed on the touch screen surface of a touch sensitive device, thereby improving the stylus experience. The adjustable effective electrode surface area stylus of the embodiments can be used to improve the sensing of an object touching or coming within proximity of a surface, while maintaining long battery life.

From the foregoing it will be appreciated that, although specific embodiments have been described herein for purposes of illustration, various modifications can be made without deviating from the spirit and scope of the disclosure. Furthermore, where an alternative is disclosed for a particular embodiment, this alternative can also apply to other embodiments even if not specifically stated.

Additionally, although embodiments are described herein in terms of a stylus, it is to be understood that other input devices and/or pointing devices can be used according to various embodiments. Also, although embodiments are described herein in terms of capacitive touch sensitive devices, it is to be understood that other touch sensitive devices capable of sensing an object touching or coming within proximity of a touch screen surface of a capacitive touch sensitive device can be used according to various embodiments.

What is claimed is:

1. An adjustable effective electrode surface area stylus configured to operate with a capacitive touch sensitive device, comprising:
    an electrode structure comprising:
        a main electrode segment disposed at a tip-end of the stylus, comprising a tip of the stylus and a main electrode inner body, the main electrode segment having a main effective electrode surface area;
        a sub-electrode segment disposed surrounding the main electrode inner body having a sub-effective electrode surface area, wherein the main electrode surface area and sub-electrode surface area together form an adjusted effective electrode surface area;
        a shielding disposed between the main electrode inner body and sub-electrode segment, electrically shielding the main electrode inner body from the sub-electrode segment; and
        a switch disposed in a connection area directly adjacent to the shielding and partially between the main electrode inner body and sub-electrode segment, electrically coupled to the main electrode segment and sub-electrode segment having an INACTIVE state and an ACTIVE state, wherein when the switch is in the INACTIVE state the main electrode segment is electrically insulated from the sub-electrode segment and when the switch is in the ACTIVE state the main electrode segment is electrically coupled to the sub-electrode segment; and a processing system disposed in a housing of the stylus electrically coupled to and driving the electrode structure to output one stimulation signal having one frequency and a flag having two settings of '0' and '1' and adjust between the output of a main capacitive projection having a main central point when the switch is in the INACTIVE state and an adjusted capacitive projection having an adjusted central point when the switch is in the ACTIVE state, wherein the projected location of the main central point is different from that of the adjusted central point, and wherein when the switch is set to the INACTIVE state the flag of the one stimulation signal is set to '0' and when the switch is set to the ACTIVE state the flag of the one stimulation signal is set to '1', wherein the capacitive touch sensitive device receives the one stimulation signal at one frequency from the stylus and determines the coordinates of the main central point when the flag received with the one stimulation signal is set to '0' and adjusted central point when the flag received with the one stimulation signal is set to '1' to calculate tilt and orientation of the stylus.

2. The adjustable effective electrode surface area stylus of claim 1, wherein the main electrode inner body further comprises a front end inner body area, a central inner body area and a back end inner body area, wherein the front end inner body area is the area closest to the tip of the stylus, the back end inner body area is the area furthest from the tip of the stylus, and the central inner body area is the area between the front end inner body area and back end inner body area.

3. The adjustable effective electrode surface area stylus of claim 2, wherein the sub-electrode segment disposed surrounding the main electrode inner body, completely surrounds the main electrode inner body.

4. The adjustable effective electrode surface area stylus of claim 3, wherein the shielding disposed between the main electrode inner body and sub-electrode segment, surrounds the central inner body area and a back end inner body area of the main electrode segment and the connection area of the switch directly adjacent to the shielding and partially between the main electrode inner body and sub-electrode segment, surrounds the front end inner body area of the main electrode segment.

5. The adjustable effective electrode surface area stylus of claim 2, wherein the sub-electrode segment disposed surrounding the main electrode inner body, surrounds the central inner body area and a back end inner body area of the main electrode segment.

6. The adjustable effective electrode surface area stylus of claim 5, wherein the shielding disposed between the main electrode inner body and sub-electrode segment, completely surrounds the main electrode inner body and the connection area of the switch directly adjacent to the shielding and partially between the main electrode inner body and sub-electrode segment, surrounds the front end inner body area of the main electrode segment and is separated therefrom by a portion of the shielding.

7. The adjustable effective electrode surface area stylus of claim 1, wherein the processing system disposed in a housing of the stylus electrically coupled to and driving the electrode structure comprises:

a processing system circuit assembly comprising:
  a clock providing a sequence of pulses;
  a microcontroller coupled to the electrode structure, amplifier, clock and switch, generating one stimulation signal having one frequency and one flag and controlling at least the one stimulation signal and switch;
  an amplifier coupled to the electrode structure and microcontroller to amplify the one stimulation signal at one frequency and one flag to the electrode structure; and
  a non-transitory computer-readable medium storing program instructions that, when executed by the microcontroller configured to interact with the capacitive touch sensitive device, causes the microcontroller to perform the steps of:
    S1) powering on;
    S2) turning on an amplifier and resetting a counter;
    S3) continuously generating one stimulation signal having one frequency and a flag to the electrode structure while switching between activation of the main electrode segment and adjusted electrode segment
    S4) continuously outputting the one stimulation signal and switching between the main electrode segment and adjusted electrode segment, projecting the main capacitive projection having the main central point and the adjusted capacitive projection having the adjusted central point, respectively; and
    S5) determining if a main time has expired;
    S6) powering off; and
a power source, wherein the power source provides power to at least the microcontroller.

8. The adjustable effective electrode surface area stylus of claim 1, wherein the processing system disposed in a housing of the stylus electrically coupled to and driving the electrode structure comprises:

a processing system circuit assembly comprising:
  a clock providing a sequence of pulses;
  a sensing element coupled to the electrode structure and microcontroller to sense tip pressure of the stylus;
  a microcontroller coupled to the electrode structure, sensing element, amplifier, dock and switch, generating one stimulation signal having one frequency and one flag and controlling at least the one stimulation signal and switch;
  an amplifier coupled to the electrode structure and microcontroller to amplify the one stimulation signal at one frequency and one flag to the electrode structure; and
  a non-transitory computer-readable medium storing program instructions that, when executed by the microcontroller configured to interact with the capacitive touch sensitive device, causes the microcontroller to perform the steps of:
    S1) powering on;
    S2) starting a clock and resetting a counter;
    S3) continuously generating one stimulation signal having one frequency and a flag to the main electrode segment of the electrode structure;
    S4) continuously outputting the one stimulation signal having one frequency and a flag from the main electrode segment, projecting the main capacitive projection having the main central point;
    S5) determining if a main time has expired;
    S6) sensing tip pressure;

S7) determining a start condition;
S8) turning on an amplifier and resetting a counter;
S9) continuously generating one stimulation signal having one frequency and a flag to the electrode structure while switching between activation of the main electrode segment and adjusted electrode segment;
S10) continuously outputting the one stimulation signal and switching between the main electrode segment and adjusted electrode segment, projecting the main capacitive projection having the main central point and the adjusted capacitive projection having the adjusted central point, respectively;
S11) determining a stop condition;
S12) determining if an adjusted time has expired;
S13) turning off the amplifier;
S14) powering off; and
a power source, wherein the power source provides power to at least the microcontroller.

9. A method for detecting an adjustable effective electrode surface area stylus configured to operate with a capacitive touch sensitive device, comprising:
detecting coordinates of a main central point of a main capacitive projection generated by a main electrode segment of an electrode structure of the stylus;
detecting coordinates of an adjusted central point of an adjusted capacitive projection generated by an adjusted electrode segment of the electrode structure of the stylus;
calculating tilt and orientation of the stylus based on the coordinates,
wherein the electrode structure comprises:
a main electrode segment disposed at a tip-end of the stylus, comprising a tip of the stylus and a main electrode inner body, the main electrode segment having a main effective electrode surface area;
a sub-electrode segment disposed surrounding the main electrode inner body having a sub-effective electrode surface area, wherein the main electrode surface area and sub-electrode surface area together form an adjusted effective electrode surface area;
a shielding disposed between the main electrode inner body and sub-electrode segment, electrically shielding the main electrode inner body from the sub-electrode segment; and
a switch disposed in a connection area directly adjacent to the shielding and partially between the main electrode inner body and sub-electrode segment, electrically coupled to the main electrode segment and sub-electrode segment having an INACTIVE state and an ACTIVE state, wherein when the switch is in the INACTIVE state the main electrode segment is electrically insulated from the sub-electrode segment and when the switch is in the ACTIVE state the main electrode segment is electrically coupled to the sub-electrode segment; and
a processing system disposed in a housing of the stylus electrically coupled to and driving the electrode structure to output one stimulation signal having one frequency and a flag having two settings of '0' and '1' and adjust between the output of a main capacitive projection having a main central point when the switch is in the INACTIVE state and an adjusted capacitive projection having an adjusted central point when the switch is in the ACTIVE state, wherein the projected location of the main central point is different from that of the adjusted central point, and wherein when the switch is set to the INACTIVE state the flag of the one stimulation signal is set to '0' and when the switch is set to the ACTIVE state the flag of the one stimulation signal is set to '1'.

10. The method for the adjustable effective electrode surface area stylus of claim 9, wherein the main electrode inner body further comprises a front end inner body area, a central inner body area and a back end inner body area, wherein the front end inner body area is the area closest to the tip of the stylus, the back end inner body area is the area furthest from the tip of the stylus, and the central inner body area is the area between the front end inner body area and back end inner body area.

11. The method for the adjustable effective electrode surface area stylus of claim 10, wherein the sub-electrode segment disposed surrounding the main electrode inner body, completely surrounds the main electrode inner body.

12. The method for the adjustable effective electrode surface area stylus of claim 11, wherein the shielding disposed between the main electrode inner body and sub-electrode segment, surrounds the central inner body area and a back end inner body area of the main electrode segment and the connection area of the switch directly adjacent to the shielding and partially between the main electrode inner body and sub-electrode segment, surrounds the front end inner body area of the main electrode segment.

13. The method for the adjustable effective electrode surface area stylus of claim 10, wherein the sub-electrode segment disposed surrounding the main electrode inner body, surrounds the central inner body area and a back end inner body area of the main electrode segment.

14. The method for the adjustable effective electrode surface area stylus of claim 13, wherein the shielding disposed between the main electrode inner body and sub-electrode segment, completely surrounds the main electrode inner body and the connection area of the switch directly adjacent to the shielding and partially between the main electrode inner body and sub-electrode segment, surrounds the front end inner body area of the main electrode segment and is separated therefrom by a portion of the shielding.

15. The method for the adjustable effective electrode surface area stylus of claim 9, wherein the processing system disposed in a housing of the stylus electrically coupled to and driving the electrode structure comprises:
a processing system circuit assembly comprising:
a clock providing a sequence of pulses;
a microcontroller coupled to the electrode structure, amplifier, clock and switch, generating one stimulation signal having one frequency and one flag and controlling at least the one stimulation signal and switch;
an amplifier coupled to the electrode structure and microcontroller to amplify the one stimulation signal to the electrode structure; and
a non-transitory computer-readable medium storing program instructions that, when executed by the microcontroller configured to interact with the capacitive touch sensitive device, causes the microcontroller to perform the steps of:
S1) powering on;
S2) turning on an amplifier and resetting a counter;
S3) continuously generating one stimulation signal having one frequency and a flag to the electrode structure while switching between activation of the main electrode segment and adjusted electrode segment;

S4) continuously outputting the one stimulation signal and switching between the main electrode segment and adjusted electrode segment, projecting the main capacitive projection having the main central point and the adjusted capacitive projection having the adjusted central point, respectively;

S5) determining if a main time has expired; and

S6) powering off a power source, wherein the power source provides power to at least the microcontroller.

16. The method for the adjustable effective electrode surface area stylus of claim 9, wherein the processing system disposed in a housing of the stylus electrically coupled to and driving the electrode structure comprises:

a processing system circuit assembly comprising:

a clock providing a sequence of pulses;

a sensing element coupled to the electrode structure and microcontroller to sense tip pressure of the stylus;

a microcontroller coupled to the electrode structure, sensing element, amplifier, clock and switch, generating one stimulation signal having one frequency and one flag and controlling at least the one stimulation signal and switch;

an amplifier coupled to the electrode structure and microcontroller to amplify the one stimulation signal at one frequency and one flag to the electrode structure; and a non-transitory computer-readable medium storing program instructions that, when executed by the microcontroller configured to interact with the capacitive touch sensitive device, causes the microcontroller to perform the steps of:

S1) powering on;

S2) starting a clock and resetting a counter;

S3) continuously generating one stimulation signal having one frequency and a flag to the main electrode segment of the electrode structure, S4) continuously outputting the one stimulation signal having one frequency and a flag from the main electrode segment, projecting the main capacitive projection having the main central point;

S5) determining if a main time has expired;

S6) sensing tip pressure:

S7) determining a start condition;

S8) turning on an amplifier and resetting a counter;

S9) continuously generating one stimulation signal having one frequency and a flag to the electrode structure while switching between activation of the main electrode segment and adjusted electrode segment;

S10) continuously outputting the one stimulation signal and switching between the main electrode segment and adjusted electrode segment, projecting the main capacitive projection having the main central point and the adjusted capacitive projection having the adjusted central point, respectively;

S11) determining a stop condition;

S12) determining if an adjusted time has expired;

S13) turning off the amplifier; and

S14) powering off; and a power source, wherein the power source provides power to at least the microcontroller.

* * * * *